United States Patent [19]
Fischbach et al.

[11] Patent Number: 5,802,060
[45] Date of Patent: Sep. 1, 1998

[54] DATA NETWORK AND A PROCESS FOR REAL TIME TRANSMISSION OF DATA PACKETS IN A DATA NETWORK

[75] Inventors: Juergen Fischbach, Biberach; Harald Greiner, Schwaikheim; Beate Kuhn-Wettemann, Kornwestheim, all of Germany

[73] Assignee: Hewlett-Packard Company, Palo Alto, Calif.

[21] Appl. No.: 565,968

[22] Filed: Dec. 1, 1995

[30] Foreign Application Priority Data

Dec. 23, 1994 [EP] European Pat. Off. .............. 94120517

[51] Int. Cl.$^6$ ..................................................... H04J 3/02
[52] U.S. Cl. .......................................... 370/444; 370/450
[58] Field of Search ............................. 370/85.4, 85.5, 370/94.1, 94.2, 94.3, 60, 60.1, 61, 444, 447, 449, 450, 451, 403, 404, 405, 452, 455, 460, 461, 389

[56] References Cited

U.S. PATENT DOCUMENTS

| | | | |
|---|---|---|---|
| 5,311,513 | 5/1994 | Ahmadi et al. | 370/85.6 |
| 5,353,287 | 10/1994 | Kudder et al. | 370/85.6 |
| 5,574,979 | 11/1996 | West | 455/67.5 |

Primary Examiner—Dang Ton

[57] ABSTRACT

A data network comprises a plurality of spatially distributed stations whose access to the network is controlled by a token. In a process for real-time transmission of data packets through the data network, the following steps are carried out in each of the stations: assigning a priority step to each data packet to be transmitted depending on the dwell time of the data packet in the station, and summing up the data amounts of the respective data packets having the same priority step; reserving in the token, send capacity required for transmitting data packets, said reservation being effected in dependence upon the send capacity available, the priority and the data amount of the data packets to be transmitted from this station, and information which is contained in the token and which concerns the priority and the data amount of data packets to be transmitted from other stations; and transmitting the data packets corresponding to the reserved send capacity when the token is next received.

10 Claims, 4 Drawing Sheets

DATA NETWORK AND A PROCESS FOR REAL TIME TRANSMISSION OF DATA PACKETS IN A DATA NETWORK

FIELD OF THE INVENTION

The present invention refers to a data network comprising a plurality of spatially distributed stations whose access to the network is controlled by a token as well as to a process for real-time transmission of data packets in a data network comprising a plurality of spatially distributed stations whose access to the network is controlled by a token.

DESCRIPTION OF THE PRIOR ART

The present invention especially refers to a process for real-time transmission of data packets in a data network interconnecting a plurality of medical devices.

In operating rooms equipped with modern instruments or in an intensive care unit of a hospital, an increasingly large number of medical devices is used for actively and passively treating a patient, most of these devices having built-in computer systems. Examples of such medical devices are patient's monitors for measuring, displaying and recording data of a patient, such as an electrocardiogram, the blood pressure, the temperature, the oxygenation of blood, etc., respiratory gas analysis systems, analysis systems for samples, e.g. blood samples, anaesthetic systems, etc.

These medical devices are normally separate devices which each require special handling.

If such devices are interconnected in a data network, the communication system has to fulfil extremely different requirements. This is due to the different data produced by the various devices. An electrocardiogram measurement, for example, produces a very large number of measured values per unit time in the case of which a delay between the measurement and the display of the measured values must essentially be constant, and the amount of delay must be as small as possible. Also when invasive blood pressure measurement is carried out, the delay between pressure fluctuations and their display on a screen should not exceed 200–400 ms.

In contrast to the above-mentioned devices, other devices, which measure slowly varying parameters, e.g. the body temperature, do not require such frequent transmissions of measured values.

In such a network, it is necessary that the various devices transmit their measured values at specific moments. In this connection, so-called time guarantees must be observed, i.e. specific measured values must have arrived at the receiver after a predetermined, maximum delay time at the latest.

In the prior art, simple so-called token passing methods are known by means of which the assignment of the transmit right to each station is controlled in a cyclic sequence. The drawback of such a simple token system is to be seen in the fact that, especially for data subjected to different time guarantees, it is not determined which data are to be transmitted at which moment from a station.

SUMMARY OF THE INVENTION

It is a major object of the present invention to provide a process for real-time transmission of data packets in a data network comprising a plurality of spatially distributed stations, said process guaranteeing that time limits for the transmission of specific data via the data network will be observed.

This object is achieved by a process for real-time transmission of data packets in a data network comprising a plurality of spatially distributed stations whose access to the network is controlled by a token, the following steps being carried out in each of said stations:

a) assigning a priority step to each data packet to be transmitted depending on the dwell time of the data packet in the station and summing up the data amounts of the respective data packets having the same priority step;

b) reserving in a token send capacity required for transmitting data packets, said reservation being effected in dependence upon the send capacity available, the priority and the data amount of the data packets to be transmitted from this station, and information which is contained in the token and which concerns the priority and the data amount of data packets to be transmitted from other stations; and c) transmitting the data packets corresponding to the reserved send capacity when the token has been received next time.

Further, this object is achieved by a process for real-time transmission of data packets in a data network comprising a plurality of spatially distributed stations whose access to the network is controlled by a token, the following steps being carried out in each of said stations:

receiving a token from a preceding station, the content of said token indicating a total send capacity as well as data amounts of data packets of all stations with the respective priority steps, transmitting data packets contained in a transmit queue, increasing the total send capacity by a send capacity value determined in a preceding token circulation cycle, reducing the data amounts of data packets of all stations having the respective priority steps by one data quantity value of one priority step, said data quantity value being determined in a preceding token circulation cycle, and resetting the send capacity value and the data quantity value;

assigning a priority step to each data packet to be transmitted depending on the dwell time of the data packet in the station and summing up the data amounts of the respective data packets having the same priority step;

starting with the highest priority step:
examining whether sufficient send capacity is available for the own data amount of this priority step;
if this is the case, reducing the available send capacity by the own data amount, increasing the send capacity value by the own data amount, reducing the available send capacity by the data amount of data packets of all stations of this priority step, and reducing the total send capacity by the own data amount;
if this is not the case, examining whether there is still any send capacity available;
if this is the case, reducing the available send capacity by part of the own data amount until send capacity no longer exists, increasing the capacity value by said part of the own data amount, increasing the data amount of data packets of all stations having this priority step by the residual own data amount, and reducing the total send capacity by said part of the own data amount;
if this is not the case, increasing the data amount of data packets of all stations having this priority step by the own data amount.

It is a further object of the present invention to provide a data network comprising a plurality of spatially distributed stations, said data network guaranteeing that time limits for the transmission of specific data via the data network will be observed.

This object is achieved by a data network comprising a plurality of spatially distributed stations whose access to the network is controlled by a token, each of said stations having the following features:

an assignment means for assigning a priority step to each data packet to be transmitted depending on the dwell time of the data packet in the station and summing up the data amounts of the respective data packets having the same priority step;

a reservation means for reserving in the token send capacity required for transmitting data packets, said reservation being effected in dependence upon the send capacity available, the priority and the data amount of the data packets to be transmitted from this station, and information which is contained in the token and which concerns the priority and the data amount of data packets to be transmitted from other stations; and a transmitting means for transmitting the data packets corresponding to the reserved send capacity when the token has been received next time.

Finally, this object is achieved by a data network data network comprising a plurality of spatially distributed stations whose access to the network is controlled by a token, each of said stations having the following features:

a token receiving means receiving the token from a preceding station, the content of said token indicating a total send capacity as well as data amounts of data packets of all stations with the respective priority steps, a transmitting means for transmitting data packets contained in a transmit queue, a total send capacity calculation means for increasing the total send capacity by a send capacity value determined in a preceding token circulation cycle, for reducing the data amounts of data packets of all stations having the respective priority steps by one data quantity value of one priority step, said data quantity value being determined in a preceding token circulation cycle, and for resetting the send capacity value and the data quantity value;

a priority determination means for assigning a priority step to each data packet to be transmitted depending on the dwell time of the data packet in the station and for summing up the data amounts of the respective data packets having the same priority step;

said priority determination means carrying out the following steps, starting with the highest priority step:

examining whether sufficient send capacity is available for the own data amount of this priority step;

if this is the case, reducing the available send capacity by the own data amount, increasing the send capacity value by the own data amount, and reducing the available send capacity by the data amount of data packets of all stations of this priority step, and reducing the total send capacity by the own data amount;

if this is not the case, examining whether there is still any send capacity available;

if this is the case, reducing the available send capacity by part of the own data amount until send capacity no longer exists, increasing the capacity value by said part of the own data amount, increasing the data amount of data packets of all stations having this priority step by the residual data amount and reducing the total send capacity by said part of the own data amount;

if this is not the case, increasing the data amount of data packets of all stations having this priority step by the own data amount In connection with the subject matter of the present invention, the urgency with which a data packet is to be transmitted will be considered greater, the longer a data packet waits for transmission in one of the stations and the closer it gets to the point at which the maximum possible delay time elapses. Hence, the most urgent packets will be transmitted.

This is done by weighting all data packets depending on their previous waiting times and the maximum admissible delay times. On the basis of this weighting, a so-called priority is determined for each data packet.

The comparison between data packets in various stations has the effect that not the most urgent data packets of an individual station will be transmitted first, but that the most urgent packets of all stations will be transmitted first.

BRIEF DESCRIPTION OF THE DRAWING

In the following, preferred embodiments of the present invention will be explained in detail on the basis of the drawings enclosed, in which.

DESCRIPTION OF PREFERRED EMBODIMENTS OF THE INVENTION

Figure 1:
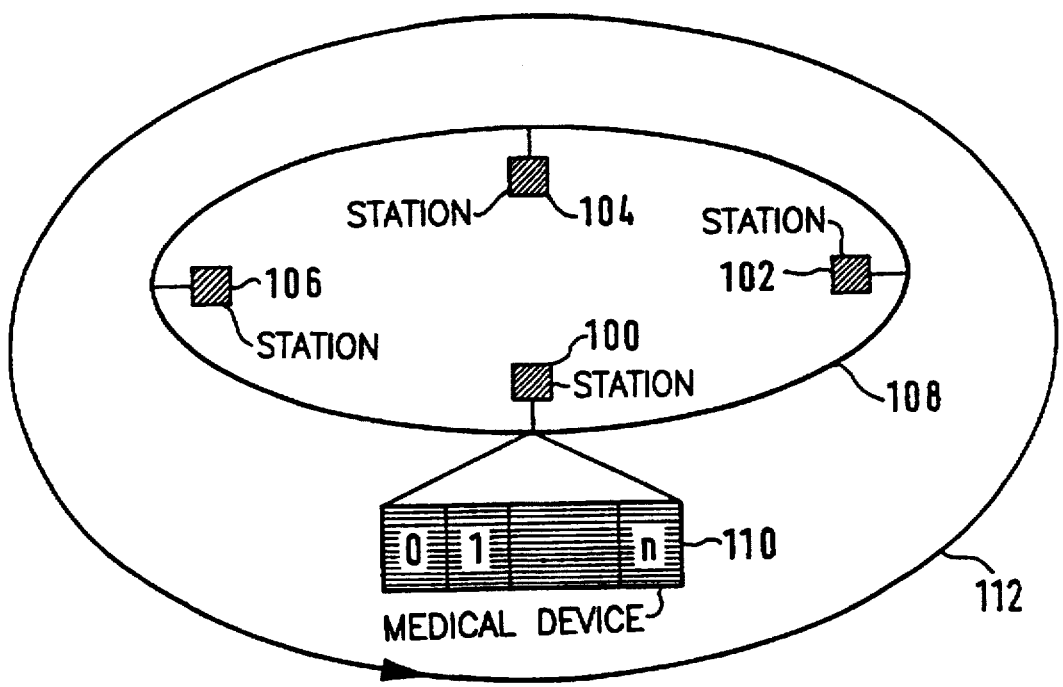
FIG. 1 shows a data network comprising a plurality of spatially distributed stations whose access to the network is controlled by a token.

FIG. 1 shows a plurality of spatially distributed stations 100, 102, 104 and 106 interconnected by a data network 108.

The stations 100 to 106 are e.g. patient's monitoring systems in different rooms of an intensive care unit of a hospital. The patient's monitoring systems may comprise various medical devices, as is shown by 110 e.g. on the basis of station 100.

The medical devices shown at 110 comprise e.g. an electrocardiographic monitor, a device for invasive blood pressure measurement, a device for measuring the body temperature, etc.. When an electrocardiographic measurement is carried out, a very high number of measured values is produced per unit time. In view of the fact that it is desirable to represent a continuous curve without any recognizable fluctuations of the display velocity on a display terminal, which is connected via the data network 108, it will be necessary to carry out a transmission of the measured values under real-time conditions. The delay between the measurement and the display must be constant, and the amount of delay must be limited as far as possible.

Upon measuring an invasive blood pressure, by way of example, the delay between the pressure fluctuations and the display on the screen should be 200–400 ms at the most so that the doctor can supervise the position of the blood pressure catheter in the patient's body by direct visual supervision upon displacing said blood pressure catheter. It follows that the delay time remaining for pure data transmission without graphics output and for additional data processing steps amounts to approx. 100 ms.

Upon measuring the body temperature, the measured values are detected at longer time intervals. In this case, one measured value per 5 seconds may suffice.

The examples described hereinbefore show clearly that the various stations make different demands on the data network. The differences exist, on the one hand, with regard to the maximum admissible delay time between the measurement and the arrival of the data at the destination and, on the other hand, with regard to the various amounts of data. For taking these differences into account, the data are assigned to various classes, which differ with regard to their maximum admissible delay time as well as with regard to the data packet magnitude which can be transmitted. This assignment to predetermined classes is carried out depending on the medical devices used.

The control of data exchange within the data network 108 and between the individual stations 100 to 106 takes place via a so-called token circulating within the data network from one station to the next, as indicated by arrow 112 in FIG. 1.

Figure 2:
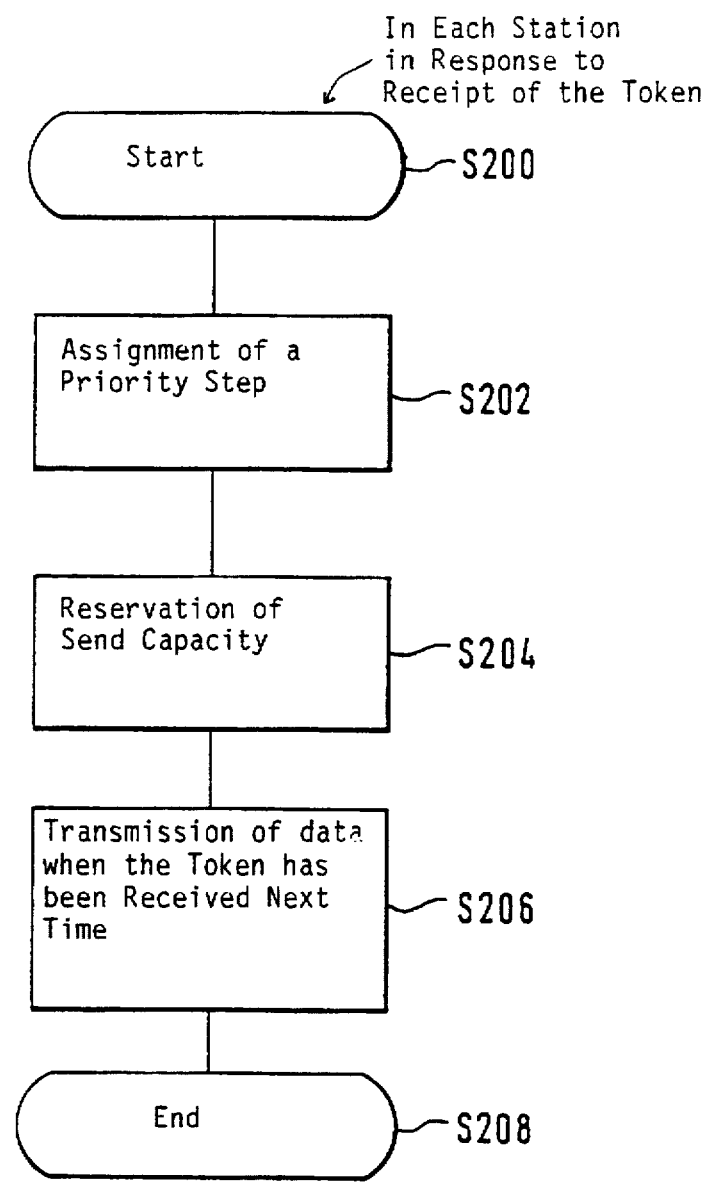
FIG. 2 shows a flow diagram representative of the process according to the present invention in one station.

On the basis of the flow diagram in FIG. 2, the steps carried out by the process according to the present invention in each of the stations upon receiving the token will be described hereinbelow.

After receipt of the token, the process is started in step S200.

In step S202, each data packet to be transmitted has assigned thereto a priority step depending on the dwell time of the data packet in the station. This assignment will be described more precisely hereinbelow. Furthermore, data amounts of data packets having the same priority step are summed up.

In step S204, a reservation in the token is carried out for the send capacity required for transmitting the data packets. This reservation is effected in dependence upon the send capacity available, the priority and the data amount of the data packets to be transmitted from this station, and information which is contained in the token and which concerns the priority and the data amount of data packets to be transmitted from other stations.

When the reservation has been finished, the data packets for which an adequate send capacity has been reserved during the preceding receipt of the token are transmitted in step S206.

In connection with specific embodiments of the present invention, a subdivision of the transmission of data packets, which is carried out in step S206, may be a preferential course of action, i.e. said transmission may, for example, be started between step S200 and step S202, and after step S204 said transmission may not be continued until all data packets (if such data packets are still present) have been transmitted.

This alternative has the advantage that losses of the network bandwidth will be avoided; such losses would be caused, if the transmission of the data packets were only carried out in step S204.

The process now ends with step S208. The token moves to the next station in the data network at which the process will be started again.

In the following, the priority step described in FIG. 2 in step S202 and the assignment of the various data packets to said priority step will be explained in detail on the basis of FIG. 3.

Figure 3:
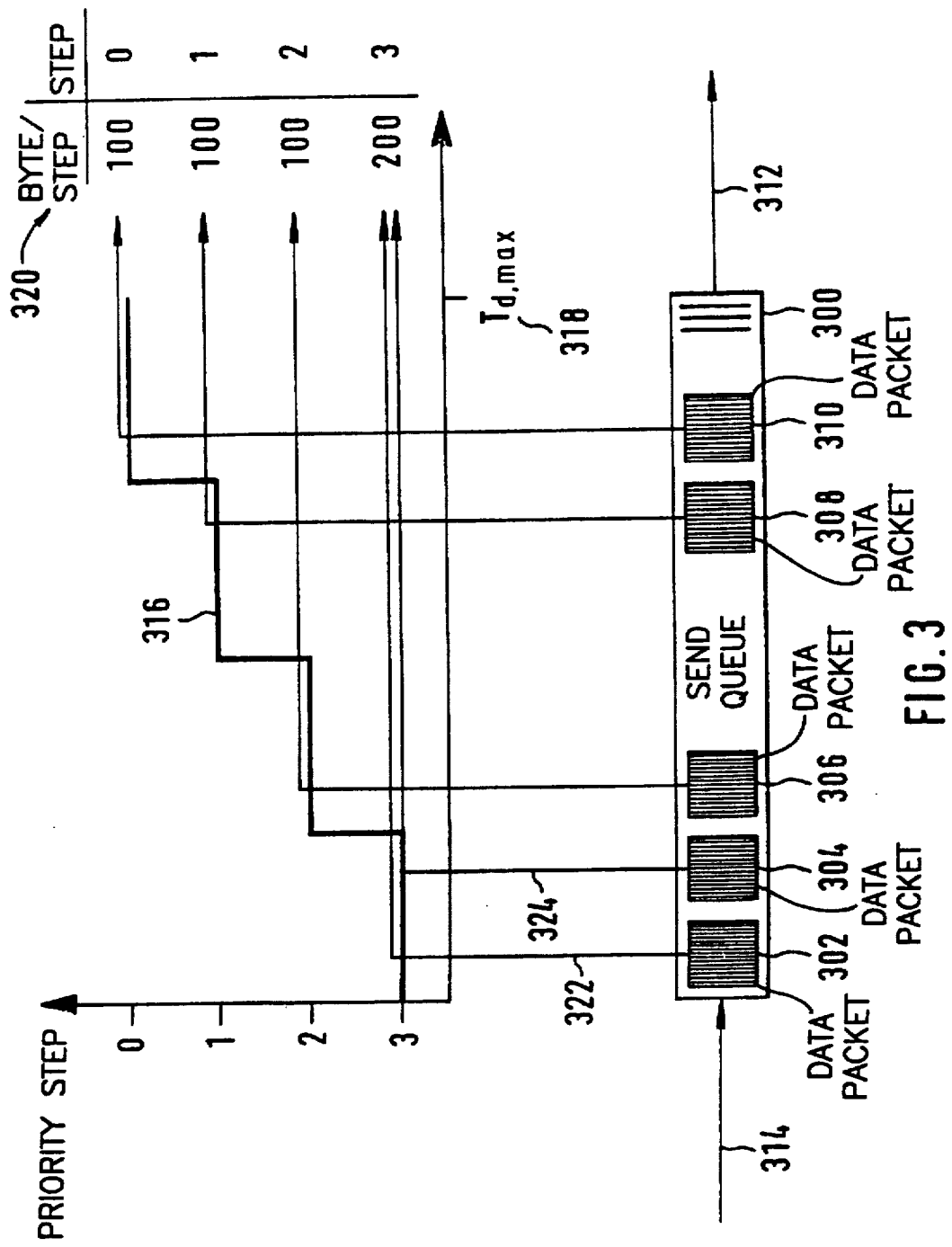
FIG. 3 shows the weighting of data packets on the basis of a priority function.

In FIG. 3, a send queue is shown at 300; five packets 302, 304, 306, 308 and 310 are present in said send queue. The packets 308 and 310 have already been in said send queue 300 for a prolonged period of time, and, according to their waiting time, they have moved up in the direction of the output 312 of the queue.

The output 312 of the send queue 300 is connected to the input of a transmit queue (not shown) which has transferred thereto data packets for which an adequate send capacity has been reserved in the token, said data packets being transmitted when the token is received next time.

Packets 302, 304 and 306 were incorporated into the send queue 300 through the input 314 thereof not long ago. The area between packet 306 and packet 308, which does not contain any packets, shows that no data packets were incorporated into the send queue 300 during this period of time.

The graph above the send queue 300 shows a characteristic of a so-called priority function 316, which has the form of stairs in the preferred embodiment of the present invention. The individual steps of the priority function 316 correspond to various priority steps which are plotted along the vertical axis. Priority step ZERO corresponds to the highest priority, whereas priority step THREE corresponds to the lowest priority. The waiting time, or dwell time, of the packets within the send queue 300 is plotted along the horizontal axis, a maximum admissible delay time Td,max (index d,max=delay, maximal) being shown at 318.

On the right-hand side of the graph, a table 320 is shown, which represents the amount of data in the respective priority steps.

For the representation in FIG. 3, it has been assumed that all data packets have the same size, said size being 100 bytes in the preferred embodiment.

Data packets 302 and 304 have assigned thereto the priority step THREE, since they were incorporated into the send queue 300 only a short time ago. This assignment is clearly shown by lines 322, 324. In view of the fact that data packets 302 and 304 have assigned thereto the same priority step the amounts of data contained in these data packets are summed up, as can be seen in the last line of table 320.

Data packet 306 has assigned thereto the priority step TWO in the same way. In view of the fact the priority step TWO has only assigned thereto data packet 306, the amount of data present in said priority step TWO is only the amount of data contained in this data packet (cf. the penultimate line of table 320).

The above applies analogously to data packet 308 with regard to priority step ONE and to data packet 310 with regard to priority step ZERO.

According to a preferred embodiment of the present invention, the token received by the station from the preceding station comprises a total send capacity $T_{free}$ and data amounts $T_0 \ldots T_{N-1}$ of data packets of all stations with the respective priority steps.

After receipt of the token, the data packets contained in a transmit queue are transmitted.

In order to regain the capacity reserved during the preceding receipt of the token, the total send capacity $T_{free}$ is increased by a send capacity value $S_{last}$ determined in the preceding token circulation cycle.

When the data amounts with the respective priority steps of this station have been transmitted, the data amounts $T_0 \ldots T_{N-1}$ of the data packets of all stations having the respective priority steps are reduced by one data quantity value $S_0 \ldots S_{N-1}$ of one priority step, said data quantity value being determined in the preceding token circulation cycle.

The send capacity value $S_{last}$ and the data quantity value $S_0 \ldots S_{N-1}$ are now reset. In a preferred embodiment, said send capacity value $S_{last}$ and said data quantity value $S_0 \ldots S_{N-1}$ are reset to zero.

Subsequently, the assignment of priority steps to each data packet to be transmitted and the summing up of data amounts of the respective data packets having the same priority step are carried out in the manner described hereinbefore in connection with FIG. 3.

Figure 4:
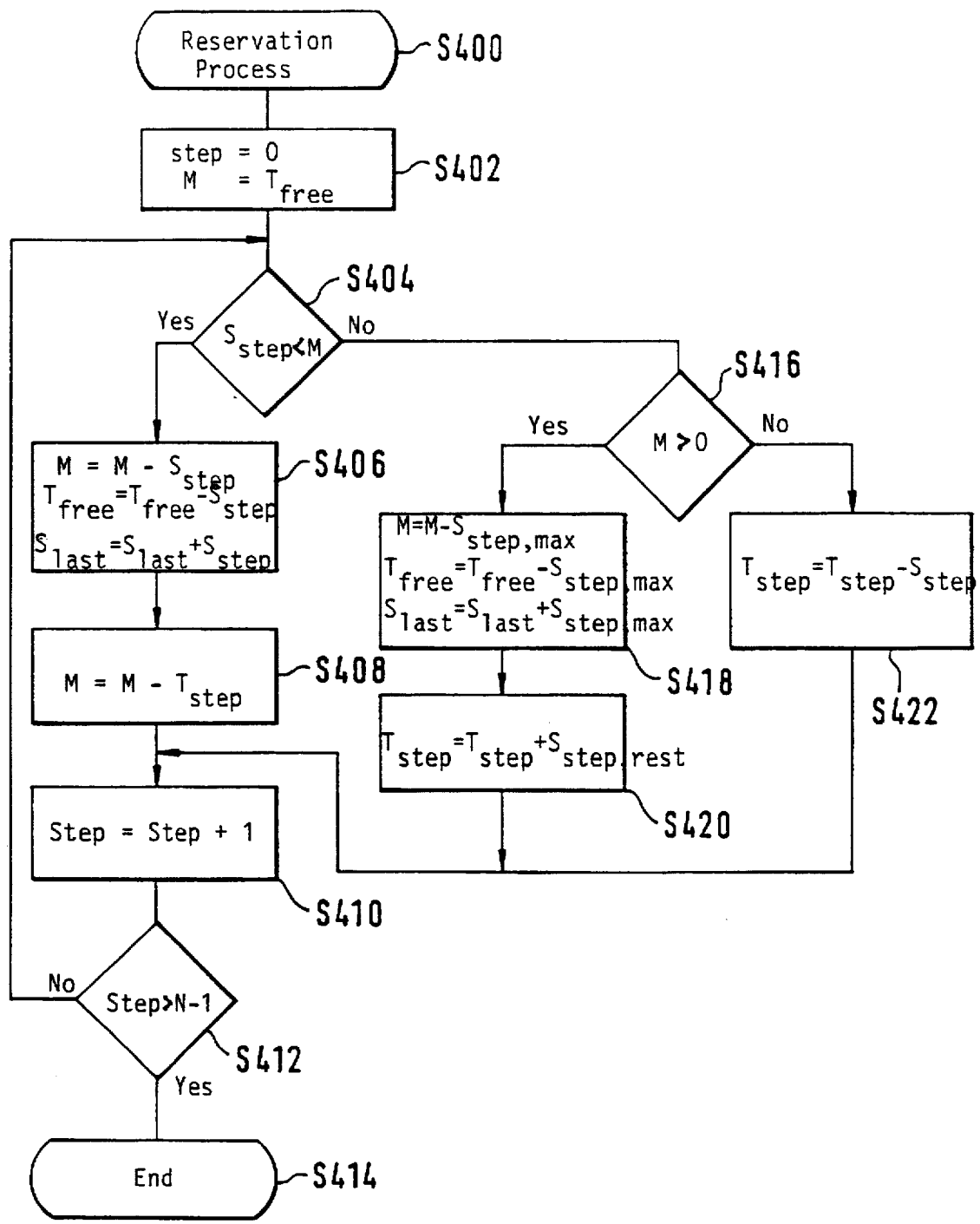
FIG. 4 shows a flow diagram representative of the send capacity reservation process.

In the following, the reservation process for the data amounts of the respective priority steps of one station is described on the basis of FIG. 4.

For this purpose, the following variables are used:

| | |
|---|---|
| $T_{free}$ | total send capacity in the data network; |
| $T_0 \ldots T_{N-1}$ | data amount of the data packets of one priority step in all stations; |
| $S_0 \ldots S_{N-1}$ | data amount of the data packets of one priority step in one station; |
| $S_{last}$ | data amount of all data packets of one station which was reserved during the last circulation of the token (predetermined data quantity value); |
| $S_{step}$ | data amount of one priority step in one station; |
| M | available send capacity for all stations; |
| $T_{step}$ | data amount of the data packets of this priority step of all stations; |
| $S_{step,max}$ | part of the data amount of one priority step of this station; and |
| $S_{step,rest}$ | the residual data amount of one priority step of this station. |

The reservation process is started with step S400.

In step S402, the variable "step", which is representative of a priority step, is set to zero. Furthermore, the variable M, which is representative of the send capacity available, is set to the total send capacity.

In the case of other embodiments, the send capacity available may be subjected not only to the influence of the total send capacity but also to other influences, such as external traffic.

In step S404, it is examined whether sufficient send capacity M is available in this station for the data amount $S_{step}$ the data packets having this priority step. If this is the case, the process will proceed to step S406.

In step S406, the send capacity M available is reduced by the own data amount $S_{step}$, the send capacity value $S_{last}$ is increased by the own data amount $S_{step}$, and the total send capacity $T_{free}$ is reduced by the own data amount $S_{step}$. In this step, the data packets are marked, which will be transmitted when the token is received next time.

In step S408, the send capacity M available is reduced by the data amount Tstep of data packets of this priority step of all stations.

In step S410, the variable "step" is increased by one, i.e. the processing of the next priority step is initiated.

In step S412, it is examined whether or not all priority steps have been processed. If this is the case, the process will be finished in step S414. Otherwise, the process will return to step S404.

If it is detected in step S404 that a sufficient send capacity M is not available for the own data amount $S_{step}$, the process will continue with step S416.

In step S416, it is examined whether available send capacity M still exists. If this is the case, the process will continue with step S418.

In step S418, the available send capacity M is reduced by part of the own data amount $S_{step,max}$ so that the available send capacity M will decrease to zero, i.e. the residual send capacity M has assigned thereto part of the data amount until it has been reduced to zero. Furthermore, the capacity value $S_{last}$ is increased by part of the own data amount $S_{step,max}$ and the total send capacity $T_{free}$ is reduced by this part of the own data amount $S_{step,max}$. In this step, the data packets are marked, which are to be transmitted when the token is received next time and which contain the part of the data amount which can still be transmitted on the basis of the existing total send capacity.

In step S420, the data amount $T_{step}$ of data packets of all stations having this priority step is increased by the residual data amount $S_{step,rest}$, i.e. the part of the own data amount $S_{step}$ which could not have assigned thereto any send capacity M is added to the data amount $T_{step}$.

Subsequently, the process continues with step S410.

If it has been determined in step S416 that send capacity M is no longer available, the data amount $T_{step}$ of data packets of all stations having this priority step is increased by the own data amount $S_{step}$ in step S422.

Subsequently, the process continues with step S410.

It is obvious that the use of the process described hereinbefore is not limited to a network connection of medical devices, but can be used in combination with any type of data networks through which devices transmit data with different demands with respect to their admissible delay time.

We claim:

1. A process for real-time transmission of data packets in a data network comprising a plurality of spatially distributed stations whose access to the data network is controlled by a token, the following steps being carried out in each of said stations:

1.1 assigning a priority step (0. . . N−1) to each data packet to be transmitted depending on a dwell time of the data packet in a station and summing up data amounts of respective data packets having a same priority step;

1.2 reserving in the token, send capacity required for transmitting of data packets to be transmitted, said reserving being effected in dependence upon an available send capacity, the priority and a data amount of the data packets to be transmitted from this station, and information which is contained in the token and which concerns the priority and the data amount of data packets to be transmitted from other stations; and 1.3 transmitting the data packets to be transmitted corresponding to the reserved send capacity when the token has been received a next time.

2. A process for real-time transmission of data packets in a data network comprising a plurality of spatially distributed stations whose access to the data network is controlled by a token, the following steps being carried out in each of said stations:

2.1 receiving in one station, the token from a preceding station, the content of said token indicating a total send capacity ($T_{free}$) as well as data amounts ($T_0 \ldots T_{N-1}$) of data packets of all stations with the respective priority steps (0. . . N−1), transmitting data packets contained in a transmit queue, increasing the total send capacity ($T_{free}$) by a send capacity value ($S_{last}$) determined in a preceding token circulation cycle, reducing the data amounts ($T_0 \ldots T_{N-1}$) of said data packets of all stations having the respective priority steps by one data quantity value ($S_0 \ldots S_{N-1}$) of one priority step, said data quantity value being determined in the preceding token circulation cycle, and resetting the send capacity value ($S_{last}$) and the data quantity value ($S_0 \ldots S_{N-1}$);

2.2 assigning a priority step to each data packet to be transmitted depending on a dwell time of a data packet in the one station and summing up the data amounts of the respective data packets having the same priority step;

2.3 starting with a highest priority step:
- 2.3.1 examining whether sufficient send capacity (M) is available for a data amount ($S_{step}$) of this priority step in the one station;
- 2.3.2 if yes, reducing available send capacity (M) by the data amount ($S_{step}$) of said one station, increasing the send capacity value ($S_{last}$) by the data amount ($S_{step}$) of said one station, reducing the available send capacity (M) by the data amount ($T_{step}$) of data packets of all stations of this priority step, and reducing the total send capacity ($T_{free}$) by the data amount ($S_{step}$) of said one station;
- 2.3.3 if no, examining whether there is still any send capacity (M) available;
  - 2.3.3.1 if yes, reducing available send capacity (M) by part of data amount ($S_{step,max}$) of said one station until send capacity (M) no longer exists, increasing the capacity value ($S_{last}$) by said part of the data amount ($S_{step,max}$) of said one station, increasing the data amount ($T_{step}$) of data packets of all stations having this priority step by the residual data amount ($S_{step,rest}$), and reducing the total send capacity ($T_{free}$) by said part of the data amount ($S_{step,max}$) of said one station;
  - 2.3.3.2 if no, increasing the data amount ($T_{step}$) of said data packets of all stations having this priority step by the data amount ($S_{step}$) of said one station.

3. A process according to claim 1, wherein the dwell time of the data packet in a station includes a maximum allowable delay of the data packet in the station, the priority step (0. . . N−1) being assigned to the data packet on the basis of a priority function having a stair-shaped characteristic, wherein priority steps occur at predetermined dwell times.

4. A process according to claim 2 comprising the following step prior to step 2.3:

determining the send capacity (M) on the basis of the total send capacity ($T_{free}$).

5. A process according to claim 2, wherein the total send capacity ($T_{free}$) in step 2.1 does not exceed a maximum value defined by the token circulation time.

6. A process according to claim 2, wherein the data packets are assigned to different classes, said classes being defined by a maximum allowable delay time and a maximum data packet magnitude, and an amount of data which can be transmitted in one class being the same for all stations or predetermined for each individual station.

7. A process according to claim 2, wherein the send capacity value ($S_{last}$) and the data quantity value ($S_0$ . . . $S_{N-1}$) are reset to zero.

8. A data network comprising a plurality of spatially distributed stations whose access to the network is controlled by a token, each of said stations comprising:

- 8.1 an assignment means for assigning a priority step (0. . . N−1) to each data packet to be transmitted, depending on a dwell time of the data packet in a station and for summing up the data amounts of data packets respectively having a same priority step;
- 8.2 reservation means for reserving in the token, send capacity required for transmitting data packets, said reserving being effected in dependence upon an available send capacity, a priority and data amount of each of the data packets to be transmitted from this station, and information which is contained in the token and which concerns the priority and the data amount of data packets to be transmitted from other stations; and
- 8.3 transmitting means for transmitting the data packets to be transmitted corresponding to the reserved send capacity when the token has is next received.

9. A data network comprising a plurality of spatially distributed stations whose access to the network is controlled by a token, each of said stations comprising:

- 9.1 token receiving means in a one station for receiving the token from a preceding station, the content of said token indicating a total send capacity ($T_{free}$) as well as data amounts ($T_0$ . . . $T_{N-1}$) of data packets of all stations with respective priority steps (0. . . N−1),
- 9.2 a transmitting means in said one station for transmitting data packets contained in a transmit queue,
- 9.3 total send capacity calculation means for increasing a total send capacity value ($T_{free}$) by a send capacity value ($S_{last}$) determined in a preceding token circulation cycle, for reducing data amounts ($T_0$ . . . $T_{N-1}$) of data packets of all stations having the respective priority steps by one data quantity value ($S_0$ . . . $S_{n-1}$ of one priority step, said data quantity value being determined in a preceding token circulation cycle, and for resetting the send capacity value ($S_{last}$) and the data quantity value ($S_0$ . . . $S_{N-1}$);
- 9.4 priority determination means for assigning a priority step to each data packet to be transmitted depending on a dwell time of the data packet in the one station and for summing up the data amounts of the respective data packets having the same priority step;

said priority determination means carrying out the following steps, starting with a highest priority step:
- 9.4.1 examining whether sufficient send capacity (M) is available for a data amount ($S_{step}$) of this priority step in said one station;
- 9.4.2 if yes, reducing the available send capacity (M) by the data amount ($S_{step}$) of said one station, increasing the send capacity value ($S_{last}$) by the data amount ($S_{step}$) of said one station, and reducing the available send capacity (M) by the data amount ($T_{step}$) of data packets of all stations of this priority step, and reducing the total send capacity ($T_{free}$) by the data amount ($S_{step}$) of said one station;
- 9.4.3 if no, examining whether there is still any send capacity (M) available;
  - 9.4.3.1 if yes, reducing the available send capacity (M) by part of a data amount ($S_{step\,max}$) of said one station until send capacity (M) no longer exists, increasing the capacity value ($S_{last}$) by said part of the data amount ($S_{step,max}$) of said one station, increasing the data amount ($T_{step}$) of data packets of all stations having this priority step by a residual data amount ($S_{step,rest}$), and reducing a total send capacity ($T_{free}$) by said part of the data amount ($S_{step,max}$) of said one station;
  - 9.4.3.2 if no, increasing the data amount ($T_{step}$) of data packets of all stations having this priority step by the data amount ($S_{step}$) of said one station.

10. A data network according to claim 8, wherein the dwell time of the data packet in a station includes a maximum allowable delay of the data packet in the station, the priority step (0. . . N−1) being assigned to the data packet on the basis of a priority function having a stair-shaped characteristic, wherein priority steps occur at predetermined dwell times.

* * * * *